United States Patent [19]

Ciokajlo et al.

[11] Patent Number: 5,018,942
[45] Date of Patent: May 28, 1991

[54] MECHANICAL BLADE TIP CLEARANCE CONTROL APPARATUS FOR A GAS TURBINE ENGINE

[75] Inventors: John J. Ciokajlo; Ambrose A. Hauser, both of Cincinnati, Ohio

[73] Assignee: General Electric Company, Cincinnati, Ohio

[21] Appl. No.: 404,923

[22] Filed: Sep. 8, 1989

[51] Int. Cl.$^5$ .............................................. F01D 5/20
[52] U.S. Cl. ................................. 415/173.2; 415/127
[58] Field of Search ............... 415/173.2, 173.1, 174.1, 415/126, 127

[56] References Cited

U.S. PATENT DOCUMENTS

| | | | |
|---|---|---|---|
| 3,039,737 | 6/1962 | Kothoff, Jr. ........................... | 415/17 |
| 3,062,497 | 11/1962 | Howes et al. ........................ | 415/126 |
| 3,085,398 | 4/1963 | Ingleson .............................. | 60/39.32 |
| 3,520,635 | 7/1970 | Killmann et al. .................... | 415/138 |
| 3,623,736 | 11/1971 | Petrie et al. ......................... | 277/27 |
| 3,966,354 | 12/1974 | Patterson ............................ | 415/116 |
| 4,005,946 | 6/1975 | Brown et al. ........................ | 415/136 |
| 4,050,843 | 9/1977 | Needham et al. .................... | 415/116 |
| 4,230,436 | 10/1980 | Davison ................................ | 415/1 |
| 4,264,274 | 4/1981 | Benedict ............................ | 415/199.5 |
| 4,330,234 | 5/1982 | Colley ................................ | 415/171 |
| 4,332,523 | 6/1982 | Smith ................................. | 415/126 |
| 4,343,592 | 8/1982 | May ................................... | 415/171 |
| 4,384,819 | 5/1983 | Baker ................................. | 415/14 |
| 4,419,044 | 12/1983 | Barry et al. ......................... | 415/117 |
| 4,632,635 | 12/1986 | Thoman et al. ...................... | 415/14 |
| 4,657,479 | 4/1987 | Brown et al. ........................ | 415/138 |
| 4,683,716 | 8/1987 | Wright et al. ...................... | 60/226.1 |
| 4,714,404 | 12/1987 | Lardellier ............................ | 415/127 |
| 4,773,817 | 9/1988 | Stangalini ............................ | 415/48 |

FOREIGN PATENT DOCUMENTS

| | | | |
|---|---|---|---|
| 26211 | 2/1982 | Japan ................................. | 415/173.2 |
| 153904 | 9/1982 | Japan ................................. | 415/174.1 |
| 2068470 | 8/1981 | United Kingdom . | |
| 2199664 | 7/1988 | United Kingdom . | |

OTHER PUBLICATIONS

Technical Report AFAPL-TR-79-2087, entitled "Thermal Response Turbine, Shroud Study", by E. J. Kawecki of Pratt & Whitney; Jul. 1979.

*Primary Examiner*—John T. Kwon
*Attorney, Agent, or Firm*—Jerome C. Squillaro

[57] ABSTRACT

A gear-actuated mechanical clearance control apparatus is operable for controlling the clearance between rotor blade tips and the casing shroud of a gas turbine engine. The apparatus includes a pair of annular rings which extend about the casing shroud, a shroud hanger disposed between the casing and an opening in the casing and between the annular rings, and a shroud segment defining a circumferential portion of the casing shroud and disposed in the casing opening. The apparatus also has an actuating mechanism which includes driven gear sectors on the annular rings which face toward one another and a gear disposed between the annular rings and having a peripheral driving gear sector which intermeshes with the driven gear sectors of the annular rings. Upon rotation of the gear, the annular rings undergo opposite circumferential movement causing radial movement of the shroud hanger and the shroud segment therewith to establish the clearance between the shroud segment and rotor blade outer tips.

16 Claims, 4 Drawing Sheets

MECHANICAL BLADE TIP CLEARANCE CONTROL APPARATUS FOR A GAS TURBINE ENGINE

CROSS REFERENCE TO RELATED APPLICATION

Reference is hereby made to the following copending U.S. patent application dealing with related subject matter and assigned to the assignee of the present invention: "Blade Tip Clearance Control Apparatus For A Gas Turbine Engine" by John J. Ciokajlo, assigned U.S. Ser. No. 405,369 and filed Sept. 8, 1989.

BACKGROUND OF THE INVENTION

1. Field of the Invention

The present invention relates generally to gas turbine engines and, more particularly, to a mechanical gear-actuated apparatus for controlling clearance between adjacent rotating and non-rotating components of a gas turbine engine.

2. Description of the Prior Art

The efficiency of a gas turbine engine is dependent upon many factors, one of which is the radial clearance between adjacent rotating and non-rotating components, such as, the rotor blade tips and the casing shroud surrounding the outer tips of the rotor blades. If the clearance is too great, an unacceptable degree of gas leakage will occur with a resultant loss in efficiency. If the clearance is too little, there is a risk that under certain conditions contact will occur between the components.

The potential for contact occurring is particularly acute when the engine rotational speed is changing, either increasing or decreasing, since temperature differentials across the engine frequently result in the rotating and non-rotating components radially expanding and contracting at different rates. For instance, upon engine accelerations, thermal growth of the rotor typically lags behind that of the casing. During steady-state operation, the growth of the casing ordinarily matches more closely that of the rotor. Upon engine decelerations, the casing contracts more rapidly than the rotor.

Control mechanisms, usually mechanically or thermally actuated, have been proposed in the prior art to maintain rotor and shroud clearance substantially constant. However, none are believed to represent the optimum design for controlling clearance. Consequently, a need still remains for an improved mechanism for clearance control that will permit maintenance of minimum rotor blade tip-casing shroud clearance throughout the operating range of the engine and thereby improve engine performance and reduce fuel consumption.

SUMMARY OF THE INVENTION

The present invention provides a mechanical blade tip clearance control apparatus which satisfies the aforementioned needs and achieves the foregoing objectives. Further, the mechanical blade tip clearance control apparatus achieves these objectives without a large increase in weight.

The mechanical clearance control apparatus of the present invention is provided in a gas turbine engine which includes a rotatable rotor having a central axis and a row of blades with outer tips and a stationary casing with a shroud and disposed in concentric relation with the rotor. The clearance control apparatus, operable for controlling the clearance between the rotor blade tips and casing shroud, comprises: (a) a structure on the stationary casing spaced radially outwardly from an opening defined in the stationary casing and defining a plurality of mounting elements extending in a substantially radial direction relative to the central rotor axis; (b) a pair of arcuate members extending circumferentially about the casing shroud and movable relative thereto, said arcuate members being spaced from opposite sides of the mounting elements of the stationary casing structure, the arcuate members having supporting elements which extend in inclined directions relative to a circumferential line about the casing shroud; (c) means disposed between the stationary casing structure and the opening in the stationary casing and between the arcuate members, the means including a shroud segment and being mounted to the supporting elements of the arcuate members for movement relative to the arcuate members and radially toward and away from the stationary casing opening, the shroud segment defining a circumferential portion of the casing shroud, being separate from the stationary casing and disposed in the stationary casing opening; and (e) actuating means disposed between the arcuate members and between the shroud segment and the stationary casing structure, the actuating means being mounted to the stationary casing structure and operable for moving the arcuate members circumferentially to cause radial movement of the shroud segment to establish a desired clearance between the shroud segment and the rotor blade outer tips.

More particularly, the supporting elements of the respective arcuate members extend in opposite inclined directions relative to a circumferential line about the casing shroud such that the inclined direction of the supporting elements of one arcuate member are opposite to that of the supporting elements of the other arcuate member. The supporting elements of the arcuate members are in the form of elongated slots which extend in the respective inclined directions. Further, the actuating means are operable for moving the arcuate members circumferentially in opposite directions to cause the radial movement of the shroud segment.

Still further, the stationary casing structure is a cylindrical support shell mounted to the casing. The shell includes a plurality of brackets and the mounting elements are in the form of elongated slots defined through the brackets and extending in substantially radial directions. The arcuate members are annular rings disposed in planes extending transverse to the central rotor axis and substantially parallel to one another. The actuating means includes driven gear sectors defined on the annular rings and facing toward one another, and a gear rotatably mounted to the support shell and disposed between the gear sectors of the annular rings. The gear has a peripheral driving gear sector thereon which intermeshes with the driven gear sectors of the annular rings.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
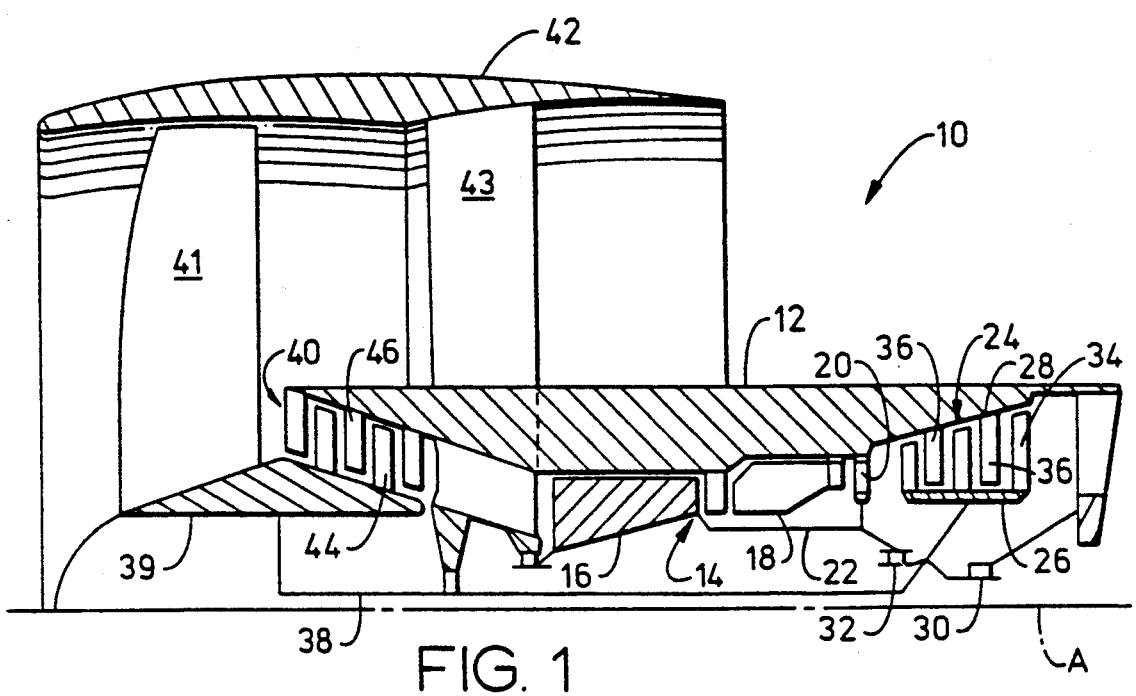
FIG. 1 is a schematic view of a gas turbine engine.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is illustrated a gas turbine engine, generally designated 10, to which the present invention can be applied. The engine 10 has a longitudinal center line or axis A and an annular casing 12 disposed coaxially and concentrically about the axis A. The engine 10 includes a core gas generator engine 14 which is composed of a compressor 16, a combustor 18, and a high pressure turbine 20, either single or multiple stage, all arranged coaxially about the longitudinal axis or center line A of the engine 10 in a serial, axial flow relationship. An annular drive shaft 22 fixedly interconnects the compressor 18 and high pressure turbine 20.

The core engine 14 is effective for generating combustion gases. Pressurized air from the compressor 16 is mixed with fuel in the combustor 18 and ignited, thereby generating combustion gases. Some work is extracted from these gases by the high pressure turbine 20 which drives the compressor 16. The remainder of the combustion gases are discharged from the core engine 14 into a low pressure power turbine 24.

The low pressure power turbine 24 includes an annular drum rotor 26 and a stator 28. The rotor 26 is rotatably mounted by suitable bearings 30 and includes a plurality of turbine blade rows 34 extending radially outwardly therefrom and axially spaced. The stator 28 is disposed radially outwardly of the rotor 26 and has a plurality of stator vane rows 36 fixedly attached to and extending radially inwardly from the stationary casing 12. The stator vane rows 36 are axially spaced so as to alternate with the turbine blade rows 34.

The rotor 26 is fixedly attached to the drive shaft 38 and interconnected to the drive shaft 22 via differential bearings 32. The drive shaft 38, in turn, rotatably drives a forward booster rotor 39 which forms part of a booster compressor 40 and which also supports forward fan blade row 41 that are housed within a nacelle 42 supported about the stationary casing 12 by a plurality of struts 43, only one of which is shown. The booster compressor 40 is comprised of a plurality of booster blade rows 44 fixedly attached to and extending radially outwardly from the booster rotor 39 for rotation therewith and a plurality of booster stator vane rows 46 fixedly attached to and extending radially inwardly from the stationary casing 12. Both the booster blade rows 44 and the stator vane rows 46 are axially spaced and so arranged to alternate with one another.

Clearance Control Apparatus of the Prior Art

Figure 2:
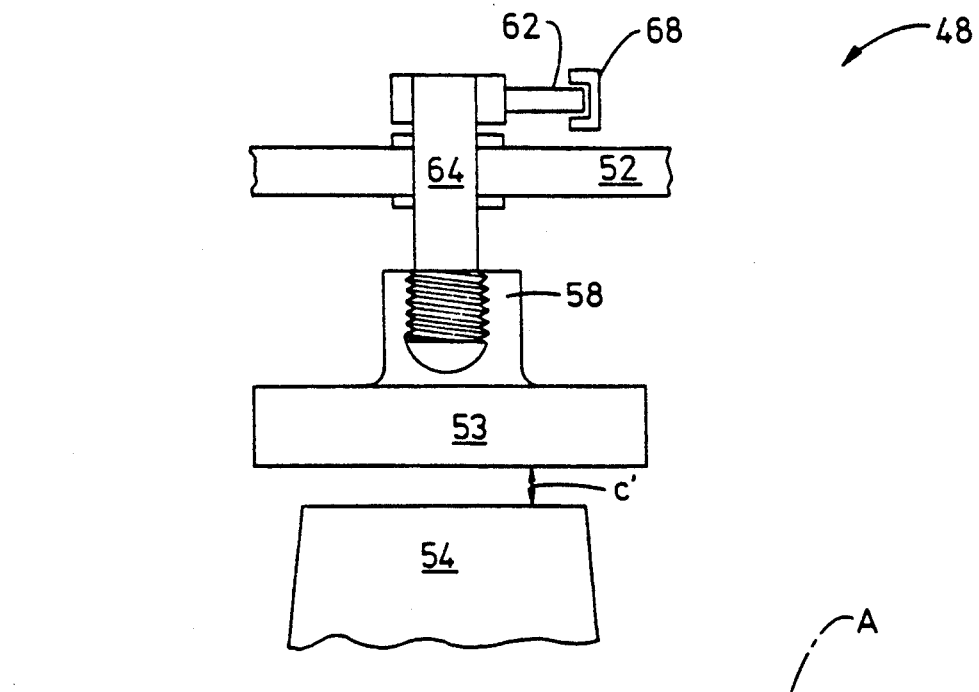
FIG. 2 is a longitudinal axial sectional view of one prior art mechanical apparatus for controlling rotor blade tip and stator casing shroud clearance.
Figure 3:
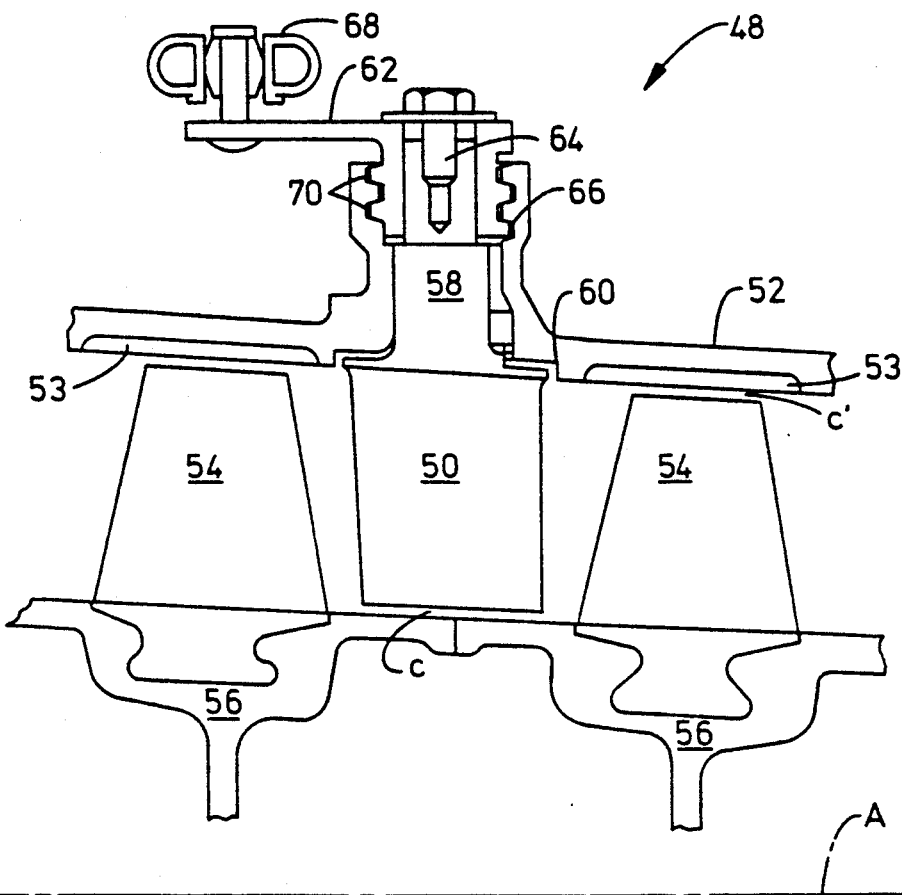
FIG. 3 is a longitudinal axial sectional view of another prior art mechanical apparatus for controlling rotor and stator vane tip clearance.
Figure 4:
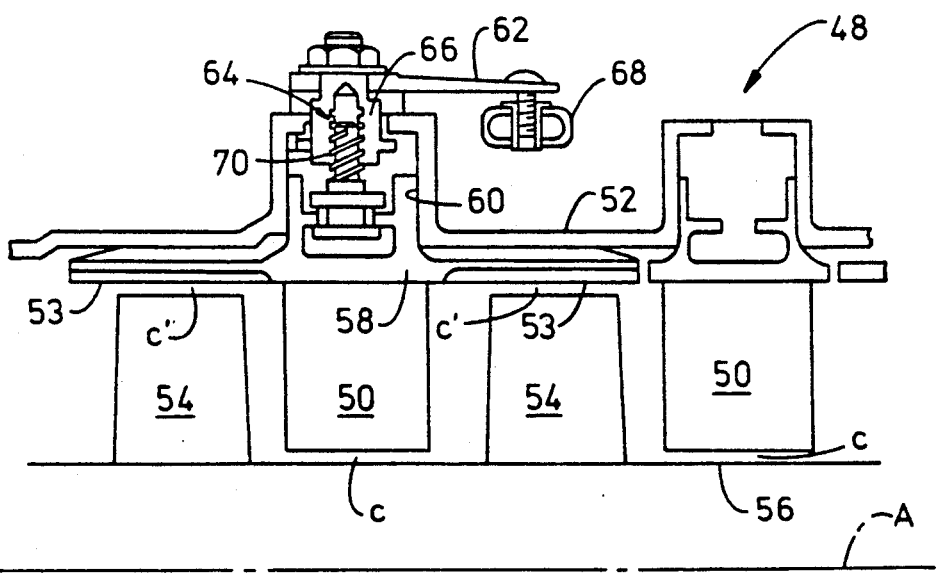
FIG. 4 is a longitudinal axial sectional view of yet another prior art mechanical apparatus for controlling rotor blade tip and stator casing shroud clearance and rotor and stator vane tip clearance.
Figure 5:
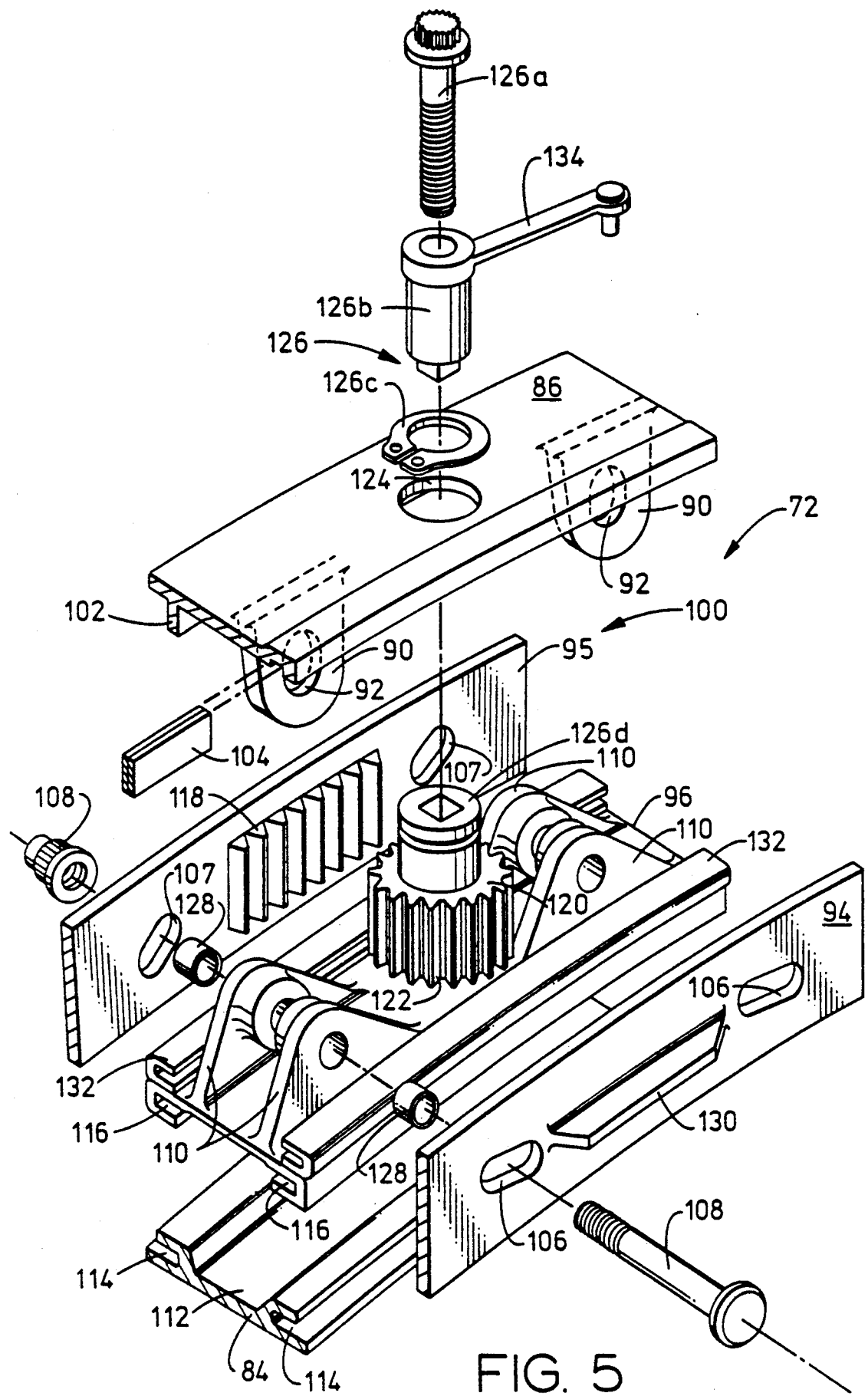
FIG. 5 is an exploded perspective view of a mechanical blade tip clearance control apparatus in accordance with the present invention.
Figure 6:
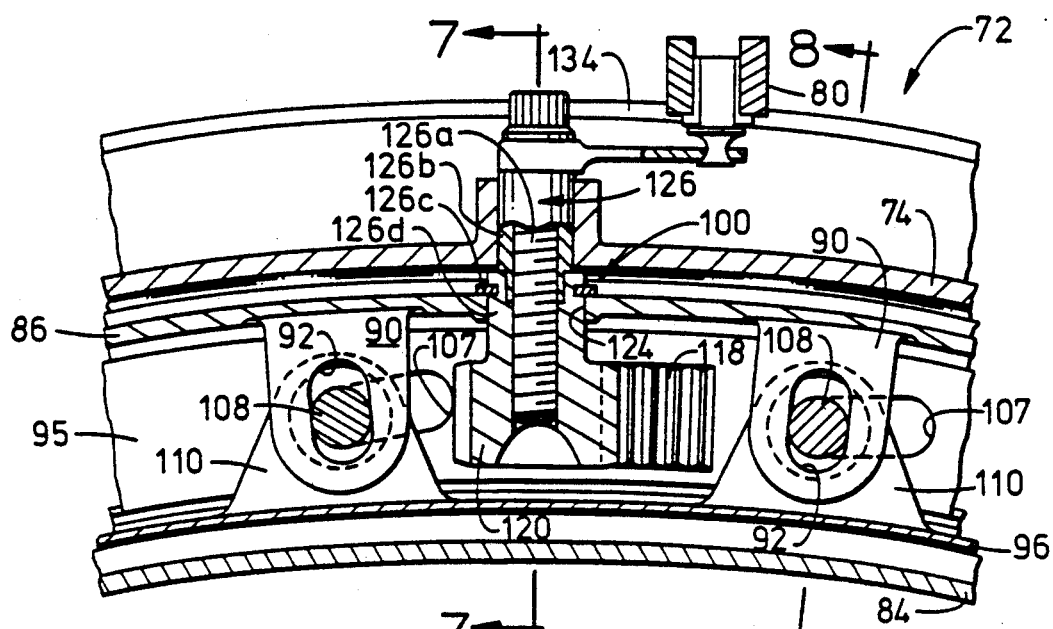
FIG. 6 is a longitudinal axial sectional view of the clearance control apparatus of FIG. 5 in assembled form and with portions illustrated in full.
Figure 7:
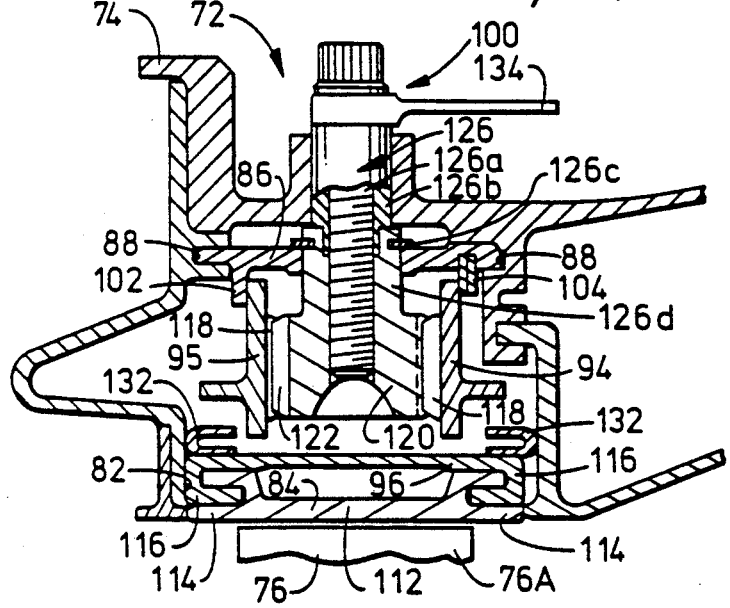
FIG. 7 is a transverse sectional view of the clearance control apparatus of FIG. 6 taken along line 7—7 of FIG. 6.
Figure 8:
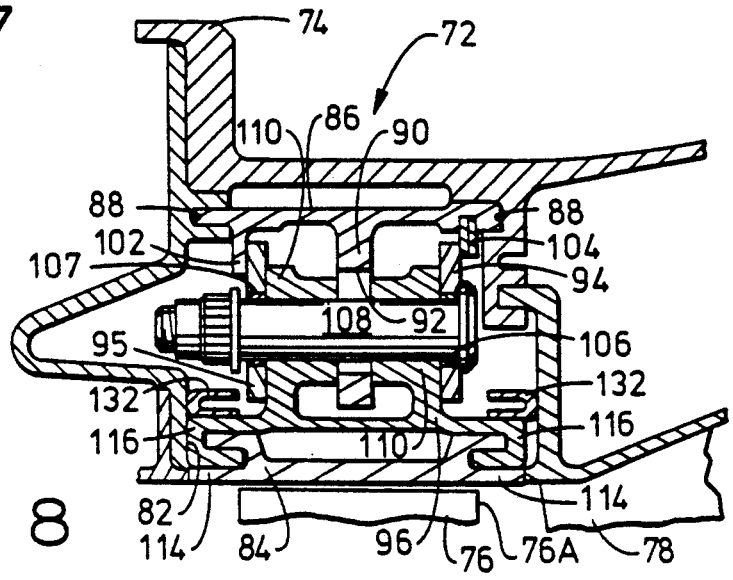
FIG. 8 is a transverse sectional view of the clearance control apparatus of FIG. 6 taken along line 8—8 of FIG. 6.

Referring now to FIGS. 2, 3 and 4, there is illustrated three variations of a prior art clearance control apparatus, generally designated 48 (disclosed on pages 8 and 15 of a publication entitled "Thermal Response Turbine Shroud Study" by E. J. Kawecki, dated July 1979, Technical Report AFAPL-TR-79-2087). The clearance control apparatus 48 is operable for changing the tip clearance gap C between the stator vanes 50, coupled on a stationary casing 52, and a rotatable rotor 56; and-/or, the tip clearance gap C' between the rotatable rotor blades 54 and the casing shroud 53 of a gas turbine engine, such as the engine 10 just described.

In the FIG. 2 embodiment, the shroud segment 53 is separate from the casing 52 and is mounted on the end of screw 64 for radial movement relative to the casing 52 toward and away from the tip of the rotor blade 54 for adjustment of the clearance gap C' therebetween. In the FIGS. 3 and 4 embodiments, the stator vanes 50 are mounted on shanks 58 which, in turn, are disposed in openings 60 in the casing 52 for radial movement toward and away from the rotor 56. Each shank is coupled to a level arm 62 by a screw 64 threaded into a fitting 66 attached to the casing 52. Also, a unison ring 68 upon circumferential movement rotates the screw 64 via the lever arm 62 in order to adjust the clearance gap. To reduce the effects of thermal expansion on the clearance control apparatus 48, each screw 64 has threads 70 of a square cross section. In each of these embodiments, the shroud segment 53 is attached to the stationary casing 52 with the shroud segment 53 being fixedly attached in the FIG. 3 embodiment and movably attached in the FIG. 4 embodiment.

It should be noted that in the FIG. 3 embodiment, the clearance control apparatus 48 operates to adjust the clearance gap C between the tip of the stator vane 50 and the rotor 56, but does not adjust the clearance gap C' between the tip of the rotor blade 54 and the shroud segment 53. However, in the FIG. 4 embodiment, operation of the clearance control apparatus 48 not only adjusts the clearance gap C between the tip of the stator vane 50 and the rotor 56, but also, simultaneously therewith, adjusts the clearance gap C' between the tip of the rotor blade 54 and the shroud segment 53.

Mechanical Clearance Control Apparatus of Present Invention

Turning now to FIGS. 5-8, there is illustrated a mechanical gear-actuated clearance control apparatus, generally designated 72, in accordance with the present invention. The apparatus 72 can advantageously be used with all compressor and turbine rotors of a gas turbine engine, such as the engine 10 illustrated in FIG. 1, where the rotors have smooth shrouded outer flowpaths and where rotor blade tip to shroud operating minimum clearances are required over the operating range of the engine. Also, the clearance control apparatus 72 is applicable to either aircraft or land based gas turbine engines.

The clearance control apparatus 72 is operable for controlling the clearance between a stationary casing 74 and a rotor (not shown) being represented by the outer tips 76A of rotor blades 76 (one shown in FIGS. 7 and 8) which extend radially outwardly in alternating fashion between the stator vanes 78 (one shown in FIG. 8) which, in turn, are stationarily attached to and extend radially inwardly from the casing 74. More particularly, a plurality of the clearance control apparatuses 72 are ganged to a circumferentially extending unison ring 80 shown in FIG. 6 to operate moving parts of the apparatuses 72 together to control the clearance the entire 360 degrees around the rotor blade tips 76A and the stationary casing 74.

Each clearance control apparatus 72 is associated with a separate portion of circumferential opening 82 formed in the stationary casing 74. Each clearance control apparatus 72 includes a shroud segment 84 separate from the stationary casing 74 and disposed in the opening 82 of the stationary casing 74. By way of example, the shroud segment 84 extends for 30 degrees or one-twelfth of the circumference of the stationary casing 74. In this example, therefore, there would be twelve clearance control apparatuses 72 (and thus twelve shroud segments 84) ganged to the unison ring 80.

Each clearance control apparatus 72 includes a structure on the stationary casing 74 in the form of a cylindrical support shell 86 mounted in opposite facing spaced circumferential grooves 88 defined in the casing 74. The support shell 86 is spaced radially outwardly from the opening 82 defined in the casing 74. The support shell 86 includes circumferentially spaced brackets 90 which extend toward the longitudinal axis A of the engine 26. Each of the brackets 90 has a slot 92 defined therethrough which is elongated in the radial direction relative to the engine axis A.

Each clearance control apparatus 72 also includes portions of a pair of 360 degree annular side rings 94, 95, a shroud hanger 96, the shroud segment 84 and an actuating mechanism 100. The annular rings 94, 95 are disposed in planes extending transverse to the longitudinal engine axis A and substantially parallel to one another. The rings 94, 95 are captured and prevented from axial movement away from one another by a circumferential flange or stop 102 and a snap ring 104 mounted at the interior along the opposite edges of the support shell 86 and projecting radially toward the engine axis A. The annular rings 94, 95 have circumferentially spaced slots 106, 107 which extend in opposite inclined directions relative to a circumferential line about the casing 74. In other words, the inclined direction of the slots 106 of the annular ring 94 are opposite to that of the slots 107 of the other annular ring 95.

The shroud hanger 96 of each clearance control apparatus 72 is disposed between the support shell 86 and the circumferential opening 82 in the stationary casing 74, and also between the annular rings 94, 95. The shroud hanger 96 is movably mounted to the annular rings 94, 95 by fasteners, such as shoulder bolts 108, received through spaced pairs of raised lugs 110 on the hanger 96 and through the oppositely aligned inclined slots 106, 107 in the rings. Further, the brackets 90 on the shell 86 are fitted between the lugs 110 and receive the bolts 108 through their slots 92.

The shroud segment 84 of each clearance control apparatus 72 is supported by the shroud hanger 96 for radially movement toward and away from the row of rotor blade outer tips 76A. More particularly, each shroud segment 84 includes an elongated arcuate body 112 having a pair of substantially C-shaped flanges 114 formed along respective opposite longitudinal sides of the body 112 which slidably interfit with complementarily C-shaped flanges 116 on the opposite edges of the shroud hanger 96. The slots 92 in the brackets 90 permit such radial movement of the shroud hanger 96 as the bolts 108 slide along the inclined slots 106, 107 in the rings 94, 95. The bolts 108 have chrome plated shanks and high temperature dry film lubricated bearing bushings 128 to minimize wear and reduce actuation forces.

The actuating mechanism 100 of each apparatus 72 includes driven gear sectors 118 and a gear 120. The gear sectors 118 in the form of racks of gear teeth are defined on the portions of the annular rings 94, 95 associated with each apparatus 72. The driven gear sectors 118 face toward one another. The gear 120 is disposed between the annular rings 94, 95 and has a peripheral driving gear sector 122 composed of a continuous row of spaced teeth which intermeshes with the teeth of the driven gear sectors 118 of the annular rings 94, 95. The gear 120 is also disposed between the support shell 86 and the shroud hanger 96. The support shell 86 has an opening 124 therein through which extends a shaft assembly 126 rotatably mounting the gear 120 upon the casing 74. The shaft assembly 126 includes a threaded bolt 126a, a hollow male socket 126b, a retainer snap ring 126c, and a female socket 126d. The female socket 126d is fixedly attached on the top surface of gear 120. The male socket 126b is coupled to the female socket 126d and the retainer snap ring 126c is applied to the top end of the female socket 126d after installation of the support shell 86 and the threaded bolt 126a is inserted through the male socket 126b and into the female socket 126d for assemblying the components of the shaft assembly 126 together and mounting of the shaft assembly 126 to the support shell 126. Upon rotation of the driving gear 120, the annular rings 94, 95, via engagement of the gear sectors 118 with the gear 120, undergo circumferential movement in opposite directions causing the bolts 108 which are constrained within the inclined slots 106, 107 of the annular rings 94, 95 to move radially and thus radial movement of the shroud hanger 96 and of the shroud segment 84 therewith to establish the desired clearance between the shroud segment 84 and rotor blade outer tips 76A.

It can be understood that the side rings 94, 95 are freely held radially, axially and circumferentially by the gears permitting the rings to thermally move radially without restraint. Further, axial protrusions 130 integral with the side rings 94, 95 are for stiffening the rings. Seals 132 prevent cooling air leakage.

Finally, a lever arm 134 is associated with each clearance control apparatus 72. It is connected at one end by the threaded bolt 126a of the shaft assembly 126 that mounts the driving gear 120 and pivotally connected at its opposite end to the unison ring 80. Thus, upon rotation of the unison ring 80 circumferentially about the stationary casing 74, each lever arm 134 pivots and rotates the gear 120 causing the desired radial movement of the shroud segment 84 toward or away from the rotor blade tip 76A.

In such manner, the shroud segment 84 is radially moved toward and away from the rotor blade tip 76A to reach a selected position relative to the rotor at which a desired clearance is established between the shroud segment 84 and the rotor blade tips 76A. Termination of rotation of the gear 120 by termination of movement of the unison ring 80 holds the shroud segment 84 at the selected position to maintain the desired clearance between the shroud segment and rotor blade tips. A rotor clearance sensor (not shown) can be installed for sensing the actual rotor blade tip shroud clearance and sending a signal to a control device which, in turn, activates an actuator to rotate the unison ring 80 for changing the clearance in the manner described earlier. Since the sensor and the components associated therewith form no part of the present invention, a detailed discussion of them is not necessary.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. In a gas turbine engine including a rotatable rotor having a central axis and a row of blades with outer tips and a stationary casing with a shroud and being disposed in concentric relation with said rotor, an apparatus for controlling the clearance between said rotor blade tips and casing shroud, said apparatus comprising:

(a) a structure on said stationary casing spaced radially outwardly from an opening defined in said stationary casing and defining a plurality of mounting elements extending in a substantially radial direction relative to said central rotor axis;

(b) a pair of arcuate members extending circumferentially about said casing shroud and movable relative thereto, said arcuate members being spaced from opposite sides of said mounting elements of said stationary casing structure, said arcuate members having supporting elements which extend in inclined directions relative to a circumferential line about said casing shroud;

(c) means disposed between said stationary casing structure and said opening in said stationary casing and between said arcuate members, said means including a shroud segment and being mounted to said supporting elements of said arcuate members for movement relative to said arcuate members and radially toward and away from said stationary casing opening, said shroud segment defining a circumferential portion of said casing shroud, being separate from said stationary casing and disposed in said stationary casing opening; and (d) actuating means disposed between said arcuate members and between a said shroud hanger and said stationary casing structure, said actuating means being mounted to said stationary casing structure and operable for moving said arcuate members circumferentially to cause radial movement of said shroud hanger and therewith radial movement of said shroud segment to establish a desired clearance between said shroud segment and rotor blade outer tips.

2. The apparatus as recited in claim 1, wherein said supporting elements of said respective arcuate members extend in opposite inclined directions relative to a circumferential line about said casing shroud such that the inclined direction of said supporting elements of one arcuate member are opposite to that of said supporting elements of the other arcuate member.

3. The apparatus as recited in claim 2, wherein said supporting elements of said arcuate members are in the form of elongated slots which extend in said respective inclined directions.

4. The apparatus as recited in claim 2, wherein said actuating means are operable for moving said arcuate members circumferentially in opposite directions to cause said radial movement of said shroud segment.

5. The apparatus as recited in claim 1, wherein said mounting elements of said stationary casing structure are in the form of elongated slots which extend in said substantially radial directions.

6. The apparatus as recited in claim 5, wherein said stationary casing structure is a cylindrical support shell mounted to said casing.

7. The apparatus as recited in claim 6, wherein said shell includes a plurality of brackets, each of said brackets having one of said slots formed therethrough.

8. The apparatus as recited in claim 1, wherein said arcuate members are annular rings disposed in planes extending transverse to said central rotor axis and substantially parallel to one another.

9. The apparatus as recited in claim 1, wherein said actuating means includes driven gear sectors defined on said arcuate members and facing toward one another 10. The apparatus as recited in claim 9, wherein said actuating means further includes a gear rotatably mounted to said stationary casing structure and disposed between said gear sectors of said arcuate members, said gear having a peripheral driving gear sector thereon which intermeshes with said driven gear sectors of said arcuate members.

11. In a gas turbine engine including a rotatable rotor having a central axis and a row of blades with outer tips and a stationary casing with a shroud and being disposed in concentric relation with said rotor, an apparatus for controlling the clearance between said rotor blade tips and casing shroud, said apparatus comprising:

(a) a structure on said stationary casing spaced radially outwardly from an opening defined in said stationary casing, said structure including brackets with slots defined therethrough, said slots being elongated in a radial direction relative to said central rotor axis;

(b) a pair of annular rings extending about said casing shroud, said rings having driven gear sectors defined thereon which face toward one another, said rings having slots defined therein, said slots of said respective rings being inclined relative to a circumferential line about said casing shroud;

(c) a shroud hanger disposed between said stationary casing structure and said opening in said stationary casing and between said annular rings, said shroud hanger being movably mounted to said rings at said slots therein;

(d) a shroud segment defining a circumferential portion of said casing shroud, being separate from said stationary casing and disposed in said opening defined in said stationary casing, said shroud segment being supported by said shroud hanger for radially movement toward and away from said row of rotor blade outer tips; and (e) a gear disposed between said annular rings and having a peripheral driving gear sector which intermeshes with said driven gear sectors of said annular rings, said gear also being disposed between said stationary casing structure and said shroud hanger and rotatably mounted to said casing structure such that, upon rotation of said gear, said annular rings undergo circumferential movement causing radial movement of said shroud hanger and of said shroud segment therewith to establish the clearance between said shroud segment and rotor blade outer tips.

12. The apparatus as recited in claim 11, wherein said slots of said annular rings extend in opposite inclined directions relative to a circumferential line about said casing shroud such that the inclined direction of said slots of one annular ring are opposite to that of said slots of the other annular ring.

13. The apparatus as recited in claim 11, wherein said gear is operable for moving said annular rings via said driven gear segments thereon circumferentially in opposite directions to cause said radial movement of said shroud hanger and therewith said radial movement of said shroud segment.

14. The apparatus as recited in claim 11, wherein said stationary casing structure is a cylindrical support shell mounted to said casing.

15. The apparatus as recited in claim 14, wherein said shell includes a plurality of brackets, each of said brackets having one of said slots formed therethrough.

16. The apparatus as recited in claim 11, wherein said annular rings are disposed in planes extending transverse to said central rotor axis and substantially parallel to one another.

* * * * *